Sept. 28, 1948.   W. H. GRANTHAM   2,450,195
ADJUSTABLE PIPE FITTING ASSEMBLY
Filed Sept. 21, 1946
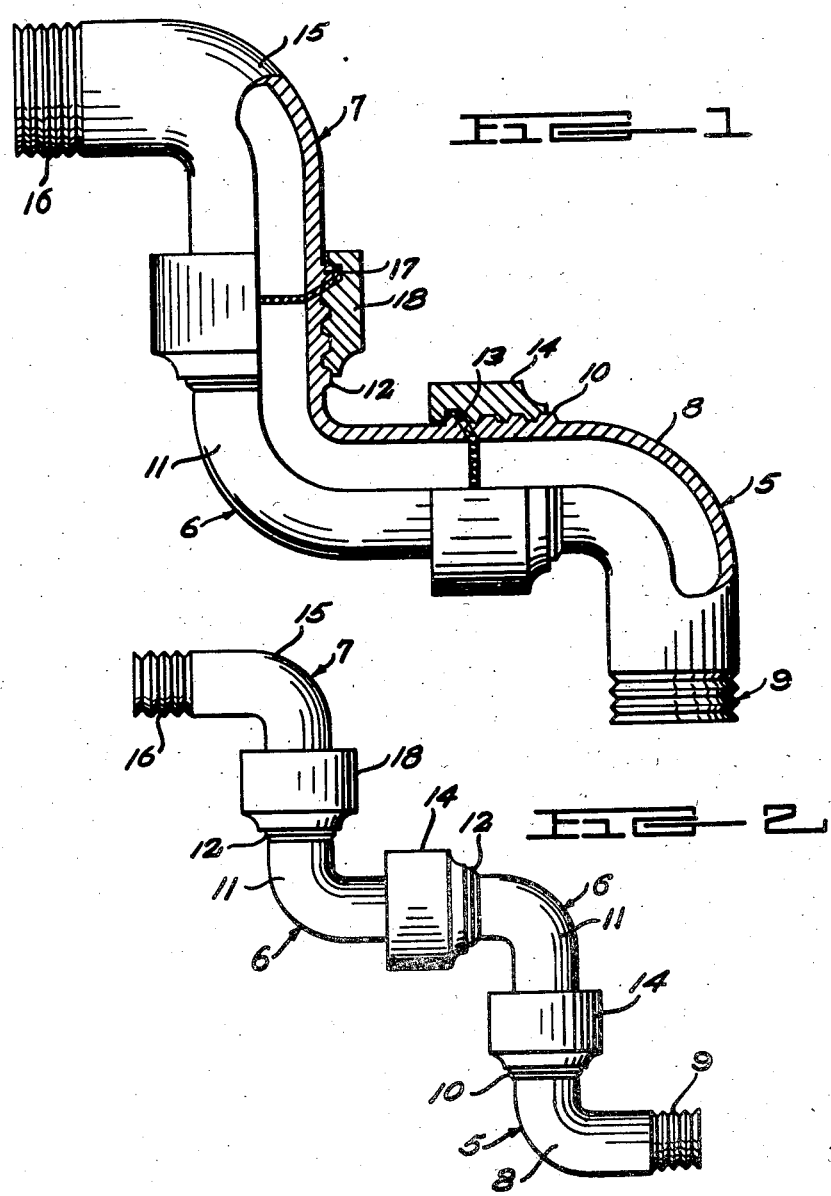

Patented Sept. 28, 1948

2,450,195

UNITED STATES PATENT OFFICE 2,450,195

ADJUSTABLE PIPE FITTING ASSEMBLY

William H. Grantham, Magnolia, Ark.

Application September 21, 1946, Serial No. 698,445

2 Claims. (Cl. 285—211)

In running pipe lines at and about oil wells, it is necessary to provide many offsets in the lines and to repeatedly extend different portions of the lines in different directions to avoid equipment and meet different conditions. Also, the pipe lines must often be taken apart and reconnected differently to meet changing conditions.

The object of the present invention, therefor, is to provide a set of different co-acting elbow pipe fittings by means of which pipe sections may be readily universally connected to effectively meet these conditions and changes and to save time and material by the ready use of a minimum number of fittings for each installation and change thereof. To this end, I provide three kinds of elbow fittings, one kind comprising an elbow body having a fine male pipe thread on one end and a coarse union thread on the other end, another kind comprising an elbow body having a coarse male union thread at one end and a union lip at the other end, and a coupling nut having swiveled engagement with said lip and adapted to be threaded on the coarse union thread of the elbow body of said one fitting, and the remaining kind comprising an elbow body having a fine male pipe thread on one end and a union lip on the other end, and a second coupling nut having swiveled engagement with the last named lip and adapted to be threaded on the coarse union thread of the elbow body of either of the first two fittings. Thus, the second named kind of fitting may be used singly or in plurality between the other two kinds of fittings and the fittings may be quickly coupled in various angularly adjusted relations to each other for effectively carrying out the stated object of the invention.

The exact nature of the present invention will become apparent from the following description when considered in connection with the accompanying drawing, in which:

Figure 1 is a view, partly in side elevation and partly in section, of an adjustable pipe fitting assembly embodying the present invention; and Figure 2 is an elevational view, drawn on a smaller scale, and illustrating a modification.

Referring in detail to the drawing, the present pipe fitting assembly embodies three kinds of elbow fittings, respectively indicated at 5, 6 and 7. The type of fitting indicated by the numeral 5 comprises an elbow body 8 having a fine male pipe thread 9 on one end and a coarse union pipe thread 10 on the other end. The kind of fitting indicated at 6 comprises an elbow body 11 having a coarse male union thread 12 on one end and a union lip 13 on the other end, and a coupling nut 14 having swiveled engagement with the lip 13 and adapted to be threaded onto the coarse union thread 10 of the elbow body 8 of the fitting 5.

The remaining kind of fitting 7 comprises an elbow body 15 having a fine male pipe thread 16 on one end and a union lip 17 on the other end, and a second coupling nut 18 having swiveled engagement with the lip 17 and adapted to be threaded onto the course union thread 12 of the elbow body 11 of the fitting 6 or onto the course union thread 10 of the elbow body 8 of the fitting 5. Thus, the second named kind of fitting 6 may be used singly between the other two kinds of fittings 5 and 7 as in Figure 1, or in plurality between said fittings 5 and 7 as in Figure 2. Due to the union joints, the fittings may be quickly coupled in various angularly adjusted relations to each other, as will be readily apparent to those skilled in the art.

From the foregoing, it will be seen that the present pipe fitting assembly provides means for extending different portions of pipe lines in different directions, either vertically or horizontally, or at any angle between the horizontal and vertical. The sections of straight pipes joined together by fitting assemblies of this kind may be readily disconnected and reconnected differently to meet changing conditions or the circumstances of different installations. The number of fittings required is reduced to a minimum, and it will be apparent that use of the invention results in saving much time and material in originally assembling the pipe lines and in taking them apart and reconnecting them differently to meet changing conditions.

What I claim is:

1. An adjustable pipe fitting assembly comprising three elbow fittings, one of said fittings comprising an elbow body having a fine male pipe thread on one end and a coarse union thread on the other end, another of said fittings comprising an elbow body having a coarse male union thread on one end and a union lip on the other end, a coupling nut having swiveled engagement with said lip and threaded onto the coarse union thread of said one fitting, the remaining fitting comprising an elbow body having a fine male pipe thread on one end and a union lip on the other end, and a second coupling nut having swiveled engagement with the last named lip and threaded onto the coarse union thread of the second-named fittings.

2. A pipe fitting assembly according to claim 1, wherein a plurality of at least two of the second named fittings are joined together and interposed between the other two fittings.

WILLIAM H. GRANTHAM.

REFERENCES CITED

The following references are of record in the file of this patent:

UNITED STATES PATENTS

| Number | Name | Date |
| --- | --- | --- |
| 1,036,684 | Muller et al. | Aug. 27, 1912 |
| 1,106,918 | Bordo | Aug. 11, 1914 |